US012384578B2

(12) United States Patent
Gillespie et al.

(10) Patent No.: US 12,384,578 B2
(45) Date of Patent: Aug. 12, 2025

(54) WIPES PROCESSING

(71) Applicant: Kenvue Brands LLC, Summit, NJ (US)

(72) Inventors: Ronald Gillespie, Skillman, NJ (US); Thad Perkins, Suamico, WI (US); Tim Fabry, De Pere, WI (US); Al Dohnalik, Green Bay, WI (US); Tom Piotrowski, Green Bay, WI (US); David Einan, Wrightstown, WI (US)

(73) Assignee: Kenvue Brands LLC, Summit, NJ (US)

(*) Notice: Subject to any disclaimer, the term of this patent is extended or adjusted under 35 U.S.C. 154(b) by 317 days.

(21) Appl. No.: 17/763,360

(22) PCT Filed: Sep. 21, 2020

(86) PCT No.: PCT/IB2020/058803

§ 371 (c)(1),
(2) Date: Mar. 24, 2022

(87) PCT Pub. No.: WO2021/059111

PCT Pub. Date: Apr. 1, 2021

(65) Prior Publication Data

US 2022/0340316 A1 Oct. 27, 2022

Related U.S. Application Data

(60) Provisional application No. 62/905,533, filed on Sep. 25, 2019.

(51) Int. Cl.
*B65B 25/14* (2006.01)
*B65B 5/04* (2006.01)
(Continued)

(52) U.S. Cl.
CPC .............. *B65B 25/146* (2013.01); *B65B 5/04* (2013.01); *B65B 63/04* (2013.01); *B65H 29/008* (2013.01);
(Continued)

(58) Field of Classification Search
CPC ......... B65B 25/146; B65B 5/04; B65H 45/22; B65H 2701/1924
See application file for complete search history.

(56) References Cited

U.S. PATENT DOCUMENTS 1,632,344 A * 6/1927 Modlin .................... G07D 3/04 53/212
2,631,417 A * 3/1953 Harrison ............. B31D 5/0086 102/361

(Continued)

FOREIGN PATENT DOCUMENTS

CN 109051870 A * 12/2018 ............... B25H 3/04
JP 2016189943 11/2016

(Continued)

OTHER PUBLICATIONS

International Search Report for PCT/IB2020/058803 dated May 6, 2021 (7 pages).

*Primary Examiner* — Lucas E. A. Palmer
(74) *Attorney, Agent, or Firm* — Rachel Chaves

(57) ABSTRACT

An apparatus and method for forming a plurality of individually folded and rolled wipe products, which allows for multiple individually folded and rolled wipe products to be processed concurrently, and which maintains moisture in the wipe product during manufacturing.

17 Claims, 8 Drawing Sheets

(51) Int. Cl.

| | |
|---|---|
| ***B65B 63/04*** | (2006.01) |
| ***B65H 29/00*** | (2006.01) |
| ***B65H 45/22*** | (2006.01) |
| ***B65H 45/28*** | (2006.01) |
| *B08B 1/14* | (2024.01) |

(52) U.S. Cl.
CPC ............. *B65H 45/22* (2013.01); *B65H 45/28* (2013.01); *B08B 1/143* (2024.01); *B65H 2701/1924* (2013.01); *B65H 2801/81* (2013.01)

(56) References Cited

U.S. PATENT DOCUMENTS

| | | | | | |
|---|---|---|---|---|---|
| 2,696,335 | A * | 12/1954 | Fies | B65B 25/146 | 53/493 |
| 3,113,410 | A * | 12/1963 | Pottle | B65B 25/146 | 53/119 |
| 3,761,032 | A * | 9/1973 | Bahnsen | A47K 10/26 | 242/534 |
| 3,787,954 | A * | 1/1974 | Gade | G03C 3/00 | 29/430 |
| 3,822,836 | A * | 7/1974 | Troyer | B65B 63/024 | 242/541.5 |
| 3,946,961 | A * | 3/1976 | Bahnsen | B65H 19/2207 | 242/532.2 |
| 4,079,574 | A * | 3/1978 | Monguzzi | B65B 63/04 | 53/119 |
| 4,115,913 | A * | 9/1978 | Moriya | G03C 3/00 | 53/118 |
| 4,601,154 | A * | 7/1986 | Ausnit | B65B 27/08 | 53/430 |
| 4,748,793 | A * | 6/1988 | Brookman | B65B 25/146 | 53/119 |
| 4,830,304 | A * | 5/1989 | Fuke | B65H 18/22 | 242/541.3 |
| 4,967,804 | A * | 11/1990 | Gotti | B65H 18/20 | 139/308 |
| 5,016,833 | A * | 5/1991 | Hamlin | B65H 29/008 | 53/118 |
| 5,174,019 | A * | 12/1992 | Lancy | G03C 3/00 | 29/806 |
| 5,222,680 | A * | 6/1993 | Barcomb | B65H 75/2245 | 210/387 |
| 5,299,411 | A * | 4/1994 | Yamamoto | B65B 25/148 | 53/465 |
| 5,386,950 | A * | 2/1995 | Abt | B65H 19/2284 | 242/541.6 |
| 5,465,919 | A * | 11/1995 | Kikuchi | B65H 75/28 | 242/607 |
| 5,875,667 | A * | 3/1999 | Reinke | G03B 17/26 | 29/806 |
| 5,895,008 | A * | 4/1999 | Sanders | B65H 29/008 | 242/541.2 |
| 6,018,929 | A * | 2/2000 | Suzuki | B65B 5/04 | 53/118 |
| 6,317,951 | B1 * | 11/2001 | Karaki | G03B 17/26 | 53/430 |
| 7,032,359 | B1 * | 4/2006 | Robert | B65B 25/148 | 53/136.2 |
| 8,500,057 | B2 * | 8/2013 | Åkerlund | B65H 19/2246 | 242/542.3 |
| 8,650,837 | B2 * | 2/2014 | Watanabe | B65B 51/06 | 53/64 |
| 8,820,036 | B2 * | 9/2014 | Collins | B65B 25/14 | 53/399 |
| 10,280,023 | B2 * | 5/2019 | Verhofstad | B65H 19/28 | |
| 2003/0010789 | A1 | 1/2003 | Sosalla | | |
| 2006/0006274 | A1 * | 1/2006 | Holub | B65B 63/024 | 53/119 |

FOREIGN PATENT DOCUMENTS

| | | | | |
|---|---|---|---|---|
| KR | 20190047964 A * | 5/2019 | | |
| WO | WO2010/047558 | 4/2010 | | |
| WO | WO-2010047558 A2 * | 4/2010 | | D21H 21/36 |

* cited by examiner

WIPES PROCESSING

CROSS-REFERENCE TO RELATED APPLICATIONS

This application is the national phase filing under 35 USC 371 of international application PCT/IB2020/058803 filed on September 21, 2020, which claims priority to U.S. patent application Ser. No. 62/905,533, filed Sep. 25, 2019, the entire contents of which are incorporated by reference herein.

FIELD

The present invention relates to methods and apparatuses for processing of moistened wipe products.

BACKGROUND

Cleansing the face, hands and skin is an important step in maintaining health and hygiene. In particular, cleansing is desired in locations and times where access to a sink or running water may not be easily accessible. To that goal, it is desirable to include pre-packaged and moistened cleansing products that may be carried and taken portably. Wipes dispensers currently exist which package a plurality of wipes in a pouch or other multi-wipe container, but these pouches are not as easy for individuals to carry with them.

It is desirable to have a single cleansing wipe product packaged in an air-tight and water-tight package, where the package may be opened and the cleansing product removed and used. Such single-use packages are convenient, portable, and reduce the risk of wipe dry-out before use. However, some single-use packages can bring difficulties in manufacturing, particularly in the speed of manufacturing, and particularly when the packaged wipe isn't simply flat folded and packaged dry. Since each wipe product must be prepared, rolled, moistened, and packaged individually, existing manufacturing processes are not efficient. Improved manufacturing processes must take into account the size of the manufacturing apparatuses, the quality of the rolling and folding processes, as well as minimizing the loss of cleansing fluid from the wipe prior to packaging.

The present invention provides systems and apparatuses, as well as methods, to accomplish more efficient manufacturing of individually-wrapped wipe products, while minimizing the space required for the manufacturing apparatus.

SUMMARY OF THE INVENTION

The present invention relates to improved processing for preparing individually packaged wet wipe products.

The invention may include a method of forming individual wet wipes, including the steps of: feeding a first end of a wipe material from a roll of wipe material into an apparatus; wetting the portion of wipe material to form a wetted wipe material; Cutting the wetted wipe material at a desired width so as to form at least two lengths of wetted wipe material; folding at least one length of wetted wipe material such that the resulting folded wipe material has a width smaller than the width of the initial width of the wipe material; cutting the folded wipe material at a desired length to form an individual folded wipe; feeding a first end of the individual folded wipe into a rolling mechanism, the rolling mechanism including a pair of elongated arms to engage the individual folded wipe; rolling the individual folded wipe by spinning the pair of elongated arms to form a rolled wipe material; and Placing the rolled wipe material into an individual wipe package. The method may avoid the use of a phasing conveyor.

The invention may include a rolling mechanism that includes a rolling containment system, which includes a pair of opposing containment sleeves extending outwardly about the pair of elongated arms. The pair of opposing containment sleeves are separated at a top portion by a gap, where the gap is large enough to receive the first end of the individual folded wipe. Further, it may be desired that the pair of opposing containment sleeves is capable of retracting and contracting with respect to each other.

The invention may include a method of forming individual wet wipes, including the steps of: feeding a first end of a wipe material from a roll of wipe material into an apparatus; wetting the portion of wipe material to form a wetted wipe material; Folding the wetted wipe material to form a folded wipe material; cutting the folded wipe material at a desired length to form an individual folded wipe material; feeding a first end of the individual folded wipe material into a rolling mechanism, the rolling mechanism including a pair of elongated arms to engage the individual folded wipe; rolling the individual folded wipe by spinning the pair of elongated arms to form a rolled wipe material; cutting the rolled wipe material at a desired width to form at least one individual folded and rolled wipe; and placing the individual folded and rolled wipe material into an individual wipe package. The method may avoid the use of a phasing conveyor.

The invention may include a rolling mechanism that includes a rolling containment system, which includes a pair of opposing containment sleeves extending outwardly about the pair of elongated arms. The pair of opposing containment sleeves are separated at a top portion by a gap, where the gap is large enough to receive the first end of the individual folded wipe. Further, it may be desired that the pair of opposing containment sleeves is capable of retracting and contracting with respect to each other.

The invention may be directed to an apparatus for rolling wetted wipes including: a rolling fork having a pair of substantially parallel rolling arms; and a rolling containment system, including a pair of opposing containment sleeves extending outwardly about the pair of elongated arms; where the pair of opposing containment sleeves are separated at a top portion by a gap, where the gap is large enough to receive a first end of a folded wipe. It may be desired that the pair of opposing containment sleeves have a generally rounded interior portion. The pair of opposing containment sleeves may be capable of retracting and contracting with respect to each other, and in some aspects, at least one of the opposing containment sleeves is spring loaded to effectuate the retracting and contracting.

DETAILED DESCRIPTION

Figure 1:
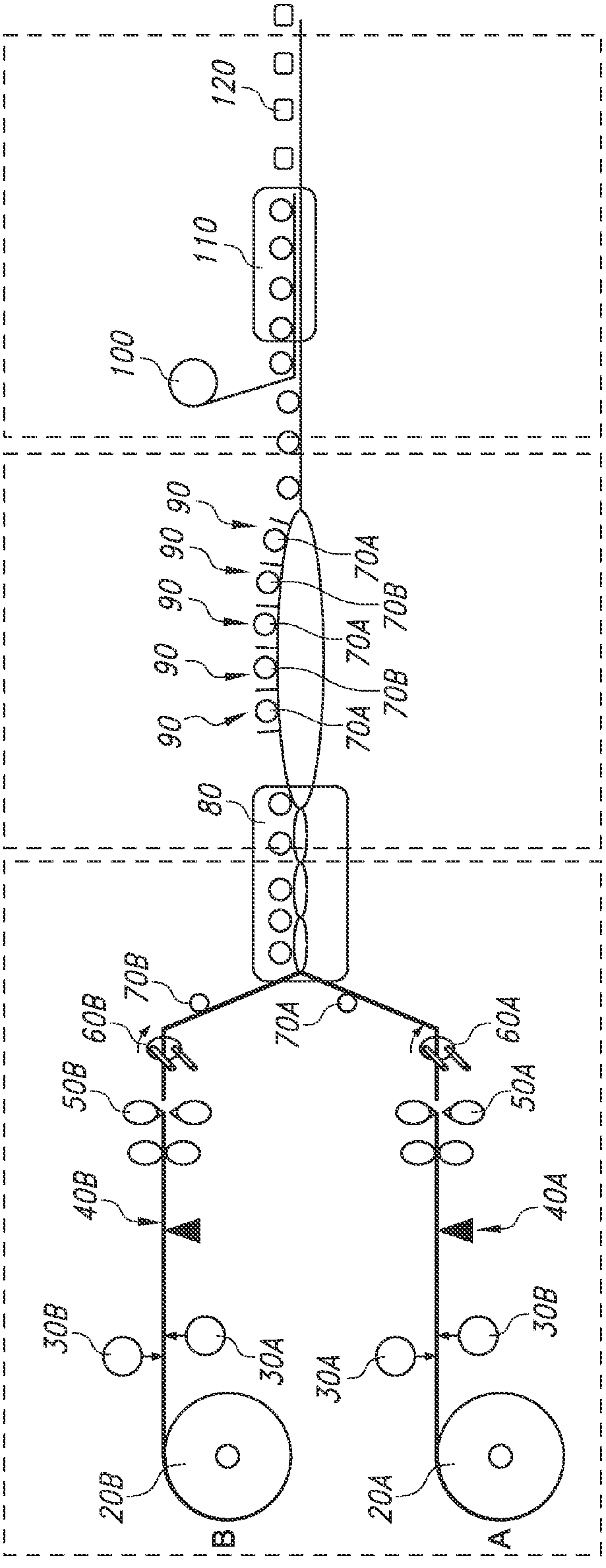
(PRIOR ART) FIG. 1
FIG. 1 (prior art) shows an existing process for preparing individually packaged wet wipe products using a single lane system.

With reference to the Figures, the present invention relates to a system of producing a plurality of individually wrapped cleansing articles, referred to herein as "wipes". Each wipe includes a desirable amount of cleansing liquid impregnated therein, in an amount effective to perform a desired cleansing function, such as cleansing of face, hands or skin, including removal of dirt and oil from the skin surface, or removal of makeup products from skin surface. In desired embodiments, one individual wipe will be packaged and contained within a single liquid-impenetrable sealed package, however more than one wipe may be contained within a single sealed package. There may be a larger package that includes a plurality of individually sealed packages, and this larger package may be resealable if desired. In use, the user grasps an individually sealed package, opens the individually sealed package (described below), and removes the wipe. Once removed, the user can unfold the wipe to a desired level, including fully unfolding and unrolling the wipe. The unfolded/unrolled wipe can then be used to cleanse the face and/or body of the user. Each wipe is a piece of fabric, which may include wipes that are woven, paper, or non-woven fabric, more specifically, non-woven wipes may be spunlace, air-laid, thermal-bond, spunmelt, needlepunch, wet-laid, or spunbond. Other suitable wipe materials include those described in U.S. Pat. No. 9,622,944, US Patent Application No. 2016/0367102 and EP 1283019, the entire disclosures of each of which are incorporated by reference herein in their entireties.

Each wipe includes a liquid cleansing composition incorporated or soaked therein. The liquid cleansing composition may include, but is not limited to, water, emollients, detergents, surfactants, fragrances, preservatives, chelating agents, pH buffers, cleansing agents, or combinations thereof, as all are well known to those skilled in the art. The wipe may contain the liquid cleansing composition in an amount of from about 2 to about 50%, or from about 4 to about 35%, and or about 4 to about 25% by weight of the wetted wipe.

A liquid cleansing composition suitable for use in wipes of the present invention may be a water-based formulation, such as an aqueous solution. The composition may be emulsion-based, in which the emulsion can be water-in-oil or oil-in-water, or can be of more complex nature such as water-in-oil-in-water, or oil-in-water-in-oil or a self-organizing liquid crystalline emulsion. The composition also may include Pickering emulsions, micro-emulsions, oil-based solutions or formulations, and hydrodispersions. In one embodiment, the liquid cleansing composition is an oil-in-water emulsion. In another embodiment, the liquid cleaning composition is an oil-in-water emulsion prepared according to the phase inversion technique as known by those skilled in the art. In other embodiments the liquid cleansing composition may be a suspension or slurry that not only cleanses the body, but also soothes and heals the body, especially in babies and in the instance of compromised skin conditions.

Other ingredients that optionally can be included in the liquid cleansing compositions include, without limitation, stabilizers, water thickeners (such as cellulose ethers), oil phase thickeners and stabilizers, suspending agents, colorants, and other benefiting agents. Examples of benefiting agents include oil and fat and their derivatives, conditioning agents, soothing agents, healing agents, insect repellent agents, deodorizing agents, antibiotics, lubricants, luminance, vitamins, moisturizers, softening agents, antistatic agents, static agents, and mixtures thereof.

The liquid cleansing compositions of this invention may be formulated into a wide variety of personal care and household cleansing applications, including but not limited to liquid cleansers, creamy cleansers, gel cleansers, soaps, sanitizers and makeup removers. One particularly useful cleanser may include a cleanser that is mild and efficient enough to be used on young children, including babies, and may be capable of removing thick creams (such as diaper rash cream) from the skin of a baby.

The liquid cleansing compositions of the invention may contain a carrier, which should be a cosmetically and/or pharmaceutically acceptable carrier. The carrier should be suitable for topical application to the skin, should have good aesthetic properties and should be compatible with other components in the composition. These compositions may comprise several types of cosmetically acceptable topical carriers including, but not limited to, solutions, emulsions (e.g., microemulsions and nanoemulsions), gels, solids and liposomes.

Desirably, the wipe has an area, measured by length x width, suitable to achieve desired cleansing. In one embodiment, the desired cleansing is to cleanse the face of a user, in particular, to remove one or more types of make-up on the face. It is desirable to use a wipe that is capable of being folded and rolled to fit into an individual package, where the ratio of the area of wipe size to the final package size is from about 13 to about 100, or from about 13 to about 25. The length of the unrolled/unfolded wipe may be 12 cm or greater, and the width of the unrolled/unfolded wipe may be 12 cm or greater. The length and/or the width of the unrolled/unfolded wipe may be up to about 20 cm, and may independently be about 9 cm to about 20 cm, or between about 13 cm to about 19 cm, or between about 12 cm to about 20 cm. In such embodiments, a desired area of the unrolled/unfolded wipe is about 144 $cm^2$, or may be up to about 250 $cm^2$. The unrolled/unfolded wipe may have a thickness of from about 0.4 mm to about 1.3 mm. Prior attempts at preparing small-scale wet wipes typically rely upon wet wipes that are much smaller, such as less than 144 $cm^2$, and therefore the present invention desirably uses a wet wipe that, when unfolded, has an area (measured by length× width) of greater than 144 $cm^2$, such as about 250 $cm^2$ or about 351 $cm^2$ (e.g., a wipe having a width of about 18.5 cm and length of about 19 cm).

The wipe is moistened with a liquid, desirably a liquid cleanser that is safe and effective to use on the hands, face, or body of the user. Some cleansers useful in the present invention include materials and cleansers identified above.

Each wipe should include the liquid cleanser in an amount effective to help cleanse the body surface to which the wipe is applied. It is particularly desired that the wipe include at least about 1 gram of liquid cleanser per one gram of fabric, but desirably no more than about 10 g of liquid per one gram of fabric. Further, it is desired that the wipe include this amount of cleanser at the time of packaging the wipe and at the time that the user opens the wipe and uses the wipe. Since maintaining the liquid cleanser in the wipe is of high importance, it is desired that the wipe be packaged as described below and also that the wipe be folded and rolled according to one of the methods of forming the wipe described below. One of the benefits of the process and systems described herein is the ability to process packaged wet wipe products efficiently without the loss of an undesirable amount of liquid cleanser during the process. Use of prior folding methods may risk undesirably squeezing out an unsuitably high amount of liquid cleanser from the wipe during the manufacturing process.

Each wipe is housed within its own individual sealed package, where it is stored until time for use. The use of individually wrapped, sealed wipes is beneficial to allow a user to maintain a plurality of wipes in a sealed environment until use. In other packaging, there is included a plurality of wipes contained within one single package, and in order to remove a wipe, the user opens the package, thereby exposing the remaining wipes to the outside environment and risking loss of liquid (and resulting dry-out), such as if the package is not resealed after use. Further, the use of individually wrapped wipes allows the user to carry one or more wipes on-the-go in a small fashion, where one or more than one wipes may be fit into a purse, wristlet or other carrying means. Therefore, individually packaged wipes are particularly useful and are embodied by the present invention.

Each wipe may be maintained in an individually wrapped, sealed package, as described above. The package may be made of any materials, including, for example, polymeric and/or foil-lined packages, which are stable and are substantially air-tight and water-tight. The material forming the package should be capable of being sealed, such as through heat, chemical, and/or other known means. It may be desired that the package have a notch or other feature to allow the user to tear open the package without the need for tools or other apparatuses to aid in the opening. The package may have indicia thereon that identify the contents therein, and may include indicia that make the individually wrapped package look substantially the same as a package including a plurality of wipes contained therein, albeit in a smaller size. It may be desired to use materials that are made from recycled materials and/or be made from materials that are recyclable. Packaging materials may include those described in EP 1283019, the contents of which are incorporated herein by reference.

Methods of preparing individually wrapped wipe products are generally known, however, these methods typically either fold a wipe along discrete lines and package the folded wipe in this state or they roll the wipe into a rolled state and package the wipe in this state. Typically, folded wipes processes include the steps of wetting the wipe, folding the wipe, cutting the wipe and packaging wipes either as single wipe packages or multiple wipes packages. However, these processes do not roll the individual wipe in addition to folding the wipe. The present method of preparing individually wrapped wipes includes a multi-step process to reduce the size of the wipe for packaging, which relies upon both folding and rolling the wipe. Folding may be achieved by using an anvil to roll the wipe into a “z” folded pattern, and rolling may be achieved through the use of rolling forks that retract after the rolling cycle.

Rolling and folding the wipe offers a number of advantages over either simply rolling or simply folding the wipe product. In methods where the wipe is folded across discrete lines without rolling, there is risk of squeezing too much liquid cleanser out of the wipe during manufacture. In addition, folding the wipe may result in a wipe that has deep and noticeable fold lines once it is opened, which can sometimes look unpleasant and may result in an undesirable skin feel, and finally it may weaken the wipe along the deep fold lines. Rolling the wipe itself eliminates some of the issues with deep fold lines, but rolling itself may have issues with sizing the wipe to achieve a small volume to be packaged individually in a desirable fashion.

Rolling and folding the wipe provides advantages in the manufacture and ultimate use of the product. Folding a wipe, by itself, makes the wipe easier to package. For example a 8"×10" wipe can be folded for packaging into a 2"×2.5" package by folding it 4 times (twice in the “x” direction and twice in the “y” direction). However, when a wipe is folded in both directions it requires unfolding 4 times (twice in the “x” direction and twice in the “y” direction). It may be difficult to easily and/or fully unfold the wipe when the wipe has been packaged in a wetted state, particularly in instances where the user does not have both hands easily available to help unfold the wipe fully. For example, such wipes may be difficult when holding an object in your hand, or holding a child.

Folding and rolling a wipe, such as that disclosed and used in this innovation, allows for a more useful and effective product. If a wipe is first folded (for example in the “x” direction) and then rolled (for example in the “y” direction), the folded and rolled wipe is much easier to open. In this example, the wipe is first easily unrolled and then unfolded only two times. In addition, through the use of less folds, the integrity of the wipe is better maintained during processing, packaging, and in use. As such, the present invention may provide wipes that are folded and rolled prior to packaging.

A “process cycle” refers to the steps needed to moisten, fold, roll and package one single wipe. In a typical processing method, the process cycle requires beginning with a roll of wipe material that is fed into an apparatus, where it is cut, moistened, folded, and packaged individually. To maintain the folded wipe after folding but before packaging, the wipes are typically put into a holding tray in the assembly apparatus, where the folded wipe is moved into a packaging step. In one previous method, the apparatus includes a rolling module that is shuttled back and forth, where it receives the cut wipe, rolls it, then places it on a conveyor. The rolling module would then traverse back to the location where it receives the cut wipe, and repeats the process by traversing back and forth between wipe receiving location and wipe placement location. The requirement to have a rolling module traverse back to the wipe receiving location and the wipe placement location after rolling loses efficiency, as can be understood by those of skill in the art. The length of time required to traverse the rolling module back to the wipe receiving location causes a loss of efficiency in manufacture. The present invention increases the efficiency of such methods.

Processing of individually wrapped products may also sometimes be accomplished in a single-line processing method, which is also a rather inefficient manner. One way to increase the output of packaged wipe products would be to add multiple lanes running in parallel. The problem with this, however, is that with every lane running in parallel, there is the space needed for the equipment for each lane. Space in manufacturing facilities is typically at a premium, and therefore, there is a desire to increase output without dramatically increasing the size of equipment (and therefore space needs in the manufacturing facility). Therefore, simply adding additional single-lane apparatuses is not a suitable way to increase output.

Simply speeding up the process may not be a desirable way to increase the efficiency of a single-lane system, even if speeding up the process was possible. If one was to simply speed up the machinery, a number of limitations and risks would become apparent. For example, the process step of wetting a wipe has a maximum speed to allow the fluid to properly distribute into the wipe before the step of folding and/or rolling. Increasing the speed at the expense of allowing for proper liquid distribution into the wipe could result in a wipe that is improperly wetted or moistened. The step of rolling also has a maximum limit, depending upon the number of rolling arms or length that they travel from the wipe receiving location to the wipe deposition location. In addition, by increasing the speed too much, there are additional risks in improper folding, loss of liquid after the wipe is wetted, and misalignment into the packaging location. Therefore, simply speeding up a single-lane system is not a practical way to significantly increase output when one cannot increase the size of the apparatus.

The present invention provides an improved apparatus to prepare folded and rolled individually packaged wetted wipes, and a method of preparing individually packaged, rolled and folded wetted wipes. The present invention reduces complexity, and also reduces "floor space", particularly as compared to simply adding additional single-lane manufacturing apparatuses or increasing speed in such single-lane manufacturing apparatuses.

The present invention includes the steps of wetting, folding, cutting and rolling in parallel through the use of multiple lanes (e.g., one lane for each wipe), as described in more detail below. The lane (or lanes) may have one rolling module per lane or may include more than one rolling module per lane. In particular, the present invention avoids the use of a rolling module that needs to be traversed between wipe receiving location and wipe placement location. Further, the present method and apparatus avoids the need for a phasing conveyor, as is sometimes used in previous methods and described in previous methods identified by FIG. 1 below.

With reference to the Figures, the present invention may be better understood.

Some previous methods to provide individually wrapped wipe products rely solely upon folding the wipe and packaging a folded wipe. The use of folding and rolling a wipe is not widely used, however, it has been done previously. FIG. 1 shows an existing process for a folded and rolled wet wipe process, which includes a single lane system with traversing roller. In this process, the apparatus 10 includes a plurality of rolls of wipe material 20A, 20B, each of which feeds a line of wipe in the apparatus 10. Fluid is applied to the wipes at fluid applicators 30A, 30B. Fluid applicators 30 may be a manifold station, using pumps, such as metered pumps. The wetted wipes then travel to a folding station 40A, 40B. Folding is typically achieved through the use of stainless-steel anvils forming a "z" folding pattern. The folded wipe then travels to a cutting apparatus 50A, 50B. Cutting apparatuses may include any means to cut the wipes, for example, a rotary cutting module may be used. The folded and cut wipes then travel to a rolling apparatus 60A, 60B, which may include a rolling fork, which retracts after the rolling cycle is completed to drop the rolled wipe 70A, 70B into a phase conveyor 80. In this previous method, a phasing conveyor is needed to ensure that the rolled wipes are spaced appropriately for packaging purposes. Each individual rolled wipe 70 is dropped into its own housing 90 in the phase conveyor 80, where the rolled wipe 70 is brought to the packaging station 110. In packaging station 110, a flow wrap 100 is sized and cut to provide a suitable outer package to house the rolled wipe 70. The package is sealed, giving a final individually sealed wet wipe product 120.

In the method described in FIG. 1, the rolling process (using rolling apparatus 60) is a single lane rolling module that rolls the wetted wipe material, the rolling apparatus 60 is shuttled back and forth, first by receiving the wetted and cut wipe, rolling it, placing it on the phase conveyor 80, and then traversing back to the location where it receives a wetted and cut wipe. FIG. 1 shows multiple duplicate processes (identified with the designator "B"), where both the A process and B process lead to the same phase conveyor 80. As noted above, this system is capable of preparing individually sealed wet wipe products 120, but it is as efficient as the present invention, since it leads to a phasing conveyor 80 and since the apparatus is shuttled back and forth as described above. In order to generate more individually sealed wet wipe products 120, speed would have to be increased (which may give problems noted above), or more lines would have to be added (which may give other problems noted above). Thus, while the system of FIG. 1 is adequate, the present invention provides an improved wipes processing method.

Figure 2:
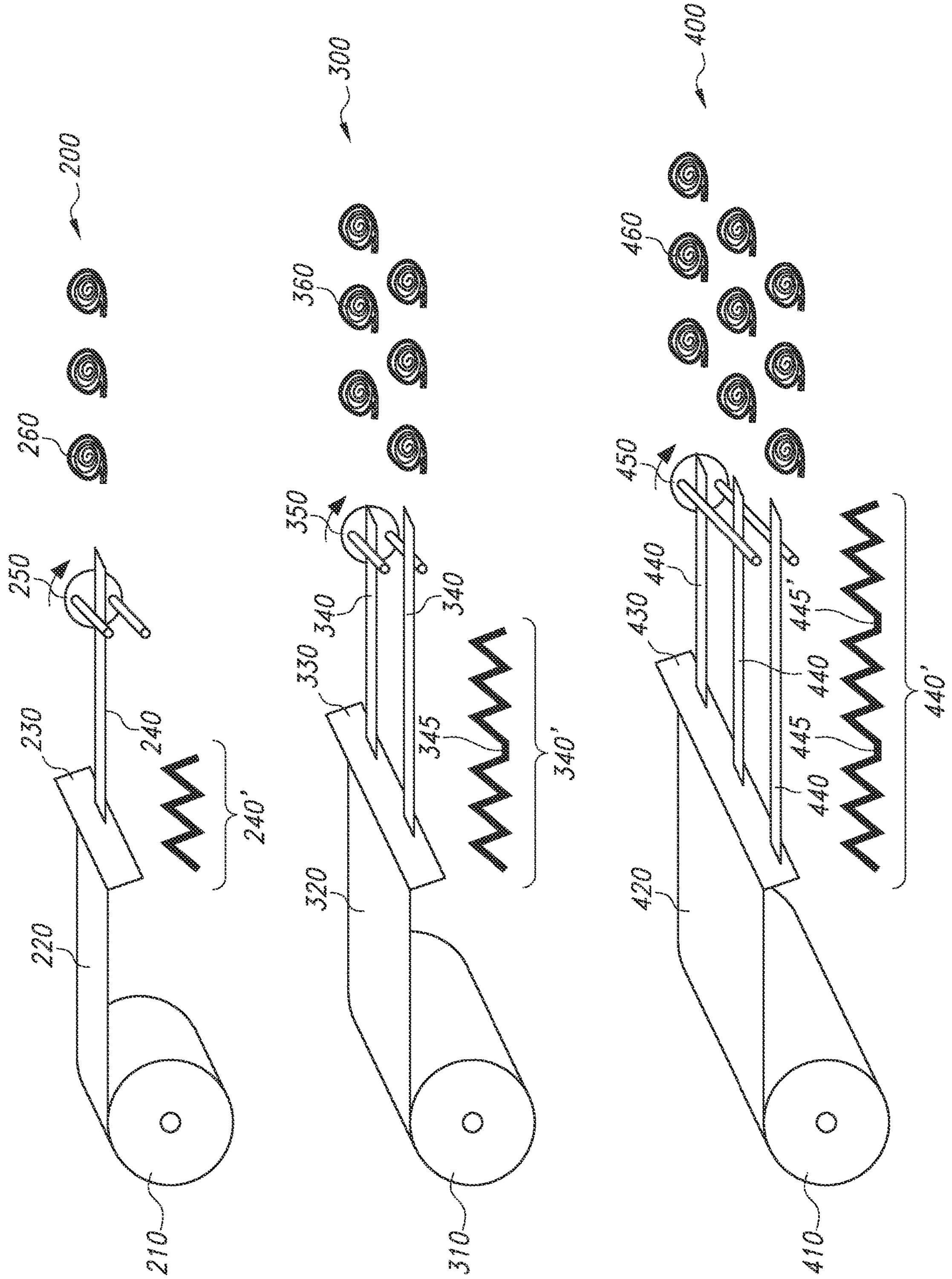
FIG. 2 demonstrates a wipe forming process including a parallel process using a single rolling apparatus FIG. 3A demonstrates one option for a process including cutting a roll of wipe material that has a width suitable for three individual wipe products.

As mentioned above, the present invention eliminates the need for a traversing apparatus or phase conveyor. FIG. 2 demonstrates the inventive process including a parallel process using a single rolling apparatus. FIG. 2 shows three embodiments of multi-lane processing, with a 1-wipe process shown as embodiment 200, a 2-wipe (two lanes in parallel) process shown as embodiment 300, and a 3-wipe (three lanes in parallel) process shown as embodiment 400. FIG. 2 shows from 1- to 3-wipe processing, but it is understood that more than three wipes may be processed concurrently through the present invention. The embodiments of FIG. 2 demonstrate the wipe starting out as a single width material, slit to multiple lanes (if needed or desired), with each lane being folded, cut to length, and rolled with a single rolling apparatus. The process uses a master roll of wipe material, which has a width equal to the length of any number of wipes desired to be processed from that master roll. For example, if two wipes are to be processed from the master roll, the width of the master roll would be equal to the width of two wipes side-by-side. If three wipes are to be processed from the master roll, the width of the master roll would be equal to the width of three wipes side-by-side. Put another way, the width of the master roll of wipe material is equal to the width of an individual wipe times the number of individual wipes to be concurrently processed.

In the 1-wipe process 200, the process begins with a roll of wipe material 210, where the roll of wipe material has a width measured the width of the desired individual wipe product. In some aspects, the width can be from about 150 mm to about 250 mm, or from about 175 mm to about 225 mm, or about 195-200 mm. The roll of wipe material 210 has a total elongated wipe length of about 5,000 to about 7,000 meters, as measured if the roll of wipe material 210 was unrolled in its entirety. During the 1-wipe process 200, the elongated wipe 220 is fed into an apparatus (not shown). The elongated wipe 220 is fed into a folding mechanism 230, where a portion of the elongated wipe 220 is subjected to folding (the portion subjected to folding being the folding wipe region 240). Folding the folding wipe region 240 produces a folded wipe section 240'. Folded wipe section 240' may have any desired folding pattern or configuration, for example, the folded wipe section 240' may have a "z" fold. The folded wipe section 240' has a width that is now smaller than the width of the folding wipe region 240 prior to folding. It may be desired that the width of the folded wipe section 240' is about ⅙ the starting width of the wipe. In instances where the starting width 240 is at or about 195 mm, the folded width may be at or about 32.5 mm. The folded width 240' may be larger if less folds are used (for example, three folds may be used, in which case the folded width 240' may be about 65 mm). After folding the wipe section, the folded wipe section 240' is cut with a cutting mechanism. Any known method may be used to cut the wipe to the proper length, including, for example, a rotating knife and anvil.

The cut and folded wipe section 240' is then passed into a rolling mechanism 250. Rolling mechanism 250 may include a forked apparatus, which is capable of retrieving a first end of the folded wipe section 240', spinning to roll the folded wipe section 240' along its length, and releasing the wipe to produce a rolled and folded wipe 260. The rolling mechanism 250 may spin 3 times, 4 times, or 5 times or more, depending upon the final diameter of the rolled and folded wipe 260 desired. The final diameter of the rolled and folded wipe 260 may be from about 15 to about 30 mm, and more desirably about 20 mm. The rolled and folded wipe 260 may be packaged into an individual packaging, as described below.

A similar process may be performed using a 2-wipe system 300, where the roll of wipe material 310 has a width that is equal to the width of two individual wipes. As mentioned above, in some aspects, the width of one wipe may be from about 150 mm to about 250 mm, and therefore, in a two-wipe system, the width of the wipe material roll may be from about 300 mm to about 500 mm (e.g., about twice the width of one individual wipe). The roll of wipe material 310 has a total elongated wipe length of about 5,000 to about 7,000 meters, as measured if the roll of wipe material 310 was unrolled in its entirety. During the 2-wipe process 300, the elongated wipe 320 is fed into an apparatus (not shown). The elongated wipe 320 is fed into a folding mechanism 330, where a portion of the elongated wipe 320 is subjected to folding (the portion subjected to folding being the folding wipe region 340). Folding the folding wipe region 340 produces a folded wipe section 340'. Folded wipe section 340' may have any desired folding pattern or configuration, for example, the folded wipe section 340' may have a "z" fold.

The folded wipe section 340' has a width that is now smaller than the width of the folding wipe region 340 prior to folding. The width of the folded wipe section 340' may be, for example, about ⅙ the starting width of the wipe. In instances where the starting width 340 is at or about 195 mm, the folded width 340' may be at or about 32.5 mm. The folded width 340' may be larger if less folds are used (for example, three folds may be used, in which case the folded width 340' may be about 65 mm). In each embodiment seen in FIG. 2 (e.g., references 200, 300 and 400), the length of the wipe is cut prior to rolling.

The folded wipe sections 340' are passed into a rolling mechanism 350. Rolling mechanism 350 may include one forked apparatus, which is sized to be able to receive a first end of two folded wipe sections 340' in a side-by-side configuration without overlapping. The forked apparatus may include two parallel arms extending perpendicular to the length of the wipe 320, where each arm may have a length equal to the total width of the wipes to be processed concurrently. It may be desired that each arm be longer than the sum of the folded lengths of the two folded wipe sections 340' side-by-side, or there may be more than one pairs of arms extending towards each other, in which one pair of arms extends at least halfway across the folded wipe sections and another pair of arms extends at least halfway across the folded wipe sections, therefore taken together, the pairs of arms extend across the entire folded wipe sections.

It may be desired that after the wipe has been cut into multiple lanes and folded, each individual folded wipe section 340' can be passed through its own independent rolling mechanism 350 (and therefore, there may be one rolling mechanism 350 per folded wipe section 340'). The rolling mechanism 350 desirably has a pair of parallel arms that extend at least as long as the width of folded wipe section 340', and desirably extends longer than the width of folded wipe section 340', so as to allow for misalignment during the manufacturing process.

In either embodiment, whether the rolling mechanism 350 receives each folded wipe sections 340' concurrently, or if each folded wipe section 340' is fed into its own individual rolling mechanism 350, the rolling mechanism 350 can spin to roll the folded wipe sections 340' along their respective length, and release the wipes to produce individual rolled and folded wipes 360. The rolling mechanism 350 may spin 3 times, 4 times, or 5 times or more, depending upon the final diameter desired. As can be appreciated, by using an initial wipe 320 that has a width equal to the width of two finished individual wipes, the number of resulting rolled and folded wipes 360 is double the number achieved in the 1-wipe process 200.

The same process may be performed using a 3-wipe system 400, where the roll of wipe material 410 has a width that is equal to the width of three individual wipes. As mentioned above, the width of one wipe may be from about 150 mm to about 250 mm, and therefore, in a three-wipe system, the width of the wipe material roll may be from about 4500 mm to about 750 mm (e.g., about three times the width of one individual wipe). The roll of wipe material 410 has a total elongated wipe length of about 5,000 meters to about 7,000 meters, as measured if the roll of wipe material 410 was unrolled in its entirety. During the 3-wipe process 400, the elongated wipe 420 is fed into an apparatus (not shown). The elongated wipe 420 is fed into a folding mechanism 430, where a portion of the elongated wipe 420 is subjected to folding (the portion subjected to folding being the folding wipe region 440). Folding the folding wipe region 440 produces a folded wipe section 440'. Folded wipe section 440' may have any desired folding pattern or configuration, for example, the folded wipe section 440' may have a "z" fold.

The folded wipe section 440' has a width that is now smaller than the width of the folding wipe region 440 prior to folding. For example, the width of the folded wipe section 440' may be about ⅙ the starting width of the wipe. In instances where the starting width 440 is at or about 195 mm, the folded width 340' may be at or about 32.5 mm. The folded width 440' may be larger if less folds are used (for example, three folds may be used, in which case the folded width 440' may be about 65 mm).

The folded wipe sections 440' are passed into a rolling mechanism 450. Rolling mechanism 450 may include one single forked apparatus, which is sized to be able to receive a first end of three folded wipe sections 440' in a side-by-side-by-side configuration without overlapping. The forked apparatus may include two parallel arms extending perpendicular to the length of the wipe 420, where each arm may have a length equal to at least the combined width of the three folded wipe sections 440', and further desired that each arm be longer than the sum of the folded lengths of the three folded wipe sections 440' side-by-side-by-side. Once rolling mechanism 450 receives the three folded wipe sections 440', the rolling mechanism 450 can spin to roll the folded wipe sections 440' along their respective length, and release the wipes to produce individual rolled and folded wipes 360. The rolling mechanism 450 may spin 3 times, 4 times or 5 times or more, depending upon the final diameter desired. As can be appreciated, by using an initial wipe 420 that has a width equal to the width of three finished individual wipes, the number of resulting rolled and folded wipes 460 is triple the number achieved in the 1-wipe process 200.

It may be desired that after the wipe has been cut into multiple lanes and folded, each individual folded wipe section 440' can be passed through its own independent rolling mechanism 450 (and therefore, there may be one rolling mechanism 450 per folded wipe section 440'). The rolling mechanism 450 desirably has a pair of parallel arms that extend at least as long as the width of folded wipe section 440', and desirably extends longer than the width of folded wipe section 440', so as to allow for misalignment during the manufacturing process.

In either embodiment, whether the rolling mechanism 450 receives each folded wipe sections 440' concurrently, or if each folded wipe section 440' is fed into its own individual rolling mechanism 450, each rolling mechanism 450 can spin to roll the folded wipe sections 440' along their respective length, and release the wipes to produce individual rolled and folded wipes 460. For example, the rolling mechanism 450 may spin 3 times, 4 times, or 5 times or more, depending upon the final diameter desired. As can be appreciated, by using an initial wipe 420 that has a width equal to the width of three finished individual wipes, the number of resulting rolled and folded wipes 460 is triple the number achieved in the 1-wipe process 200.

The same process may be performed using any number of wipe system, where the starting roll of wipe material has a width equal to the number of individual wipes desired to be produced. In addition, the system may include one single, elongated rolling system to roll multiple folded wipe sections concurrently, or each folded wipe section may be fed into its own independent rolling system, where each rolling system rolls one folded wipe section itself In embodiments where the starting roll of wipe material has a width that is larger than the width of one individual wipe (and therefore needs to be subjected to a width cutting process), e.g., in a two-wipe system or three-wipe system, or in any number of wipe system larger than one, the present innovation includes two separate cutting steps. One of the cutting steps cuts the wipe to provide a cut wipe with a desired width, and the other cutting step cuts the wipe to provide the cut wipe with a desired length. Cutting the roll of wipe material to the proper width (or widths) is referred to as the Width Cutting Process. Cutting the roll of wipe material to the proper length is referred to as the Length Cutting Process.

Width Cutting Process. Since the system is a multi-wipe system, including a roll of starting wipe material that is intended for more than one wipe, one cutting that may be incorporated is to split the wipe into two distinct wipes having desired widths. Thus, this cutting process is the Width Cutting Step. The width cutting step may be performed after the roll of wipe material has been wetted, but prior to folding and rolling. In other aspects, the width cutting process may be performed after the wipe roll is folded and rolled. A cutting (or slitting) process is used to separate the roll of wipe into individual wipe lanes, each wipe lane having a desired width for a single wipe. The wider the master roll, the more lanes can be processes and a “cutting” (or slitting) process is use. If the roll of wipe material is the width of two wipes, then one cutting machine (e.g., a rotating knife and anvil) may be used, if the roll of wipe material is the width of three wipes, then two cutting machines (e.g., a rotating knife and anvil) may be used.

Length Cutting Process. The Length Cutting Process cuts the roll of wipe to its appropriate or desired length, the length being the length of an individual wipe. Any desired method to cut the wipe to the proper length may be used, including, for example, a rotating knife and anvil system. The system may include one of two process flows, when starting with a master roll of wipe material that needs to be subjected to the width cutting process. The first process flow begins by unwinding the roll of wipe material, and wetting that wipe material. The wetted wipe material is now subjected to the width cutting step (splitting the wetted roll into a desired number of wipe widths). The cut wipe materials are folded, cut to desired length to give an individual folded wipe (the length cutting step), and the individual folded wipe is rolled. The final cut, folded, and rolled wipe is packaged into a desired packaging.

The second option for the process flow may perform the width cutting step after the product is rolled. The second option for a process flow begins by unwinding the roll of wipe material, and wetting that wipe material. The wetted wipe material is folded, cut to desired length to give an individual folded wipe (the length cutting process), and then the folded wipe is rolled. At this point, the rolled wipe material has a width that is still wider than the width of one individual wipe product, and therefore the rolled wipe material is subjected to the width cutting step (thereby splitting the wetted, folded and rolled wipe into a desired number of wipe widths). The final cut, folded, and rolled wipe is packaged into a desired packaging.

Figure 3A:
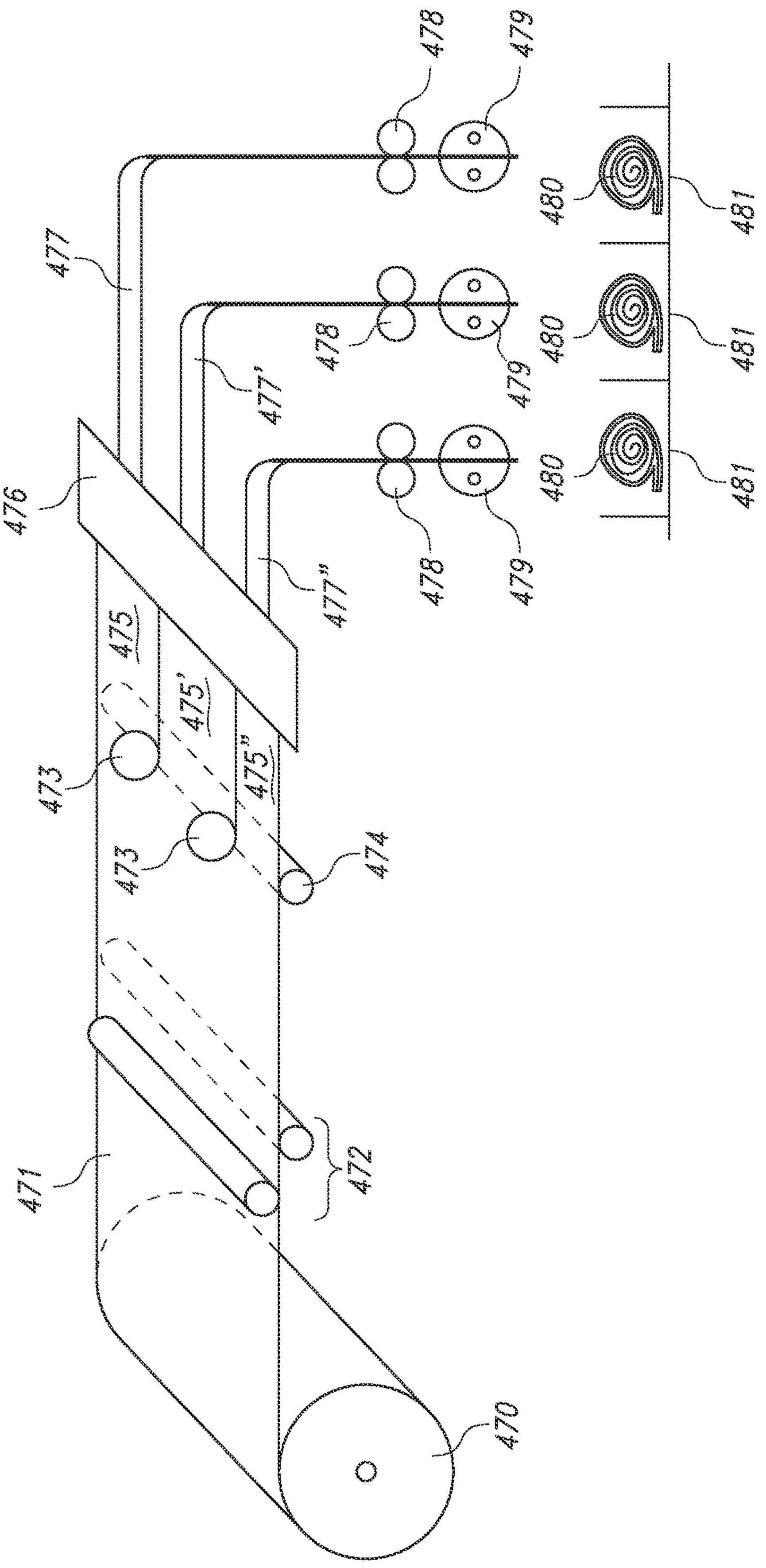
FIG. 3B demonstrates a second option for a process including cutting a roll of wipe material that has a width suitable for three individual wipe products.
Figure 3B:
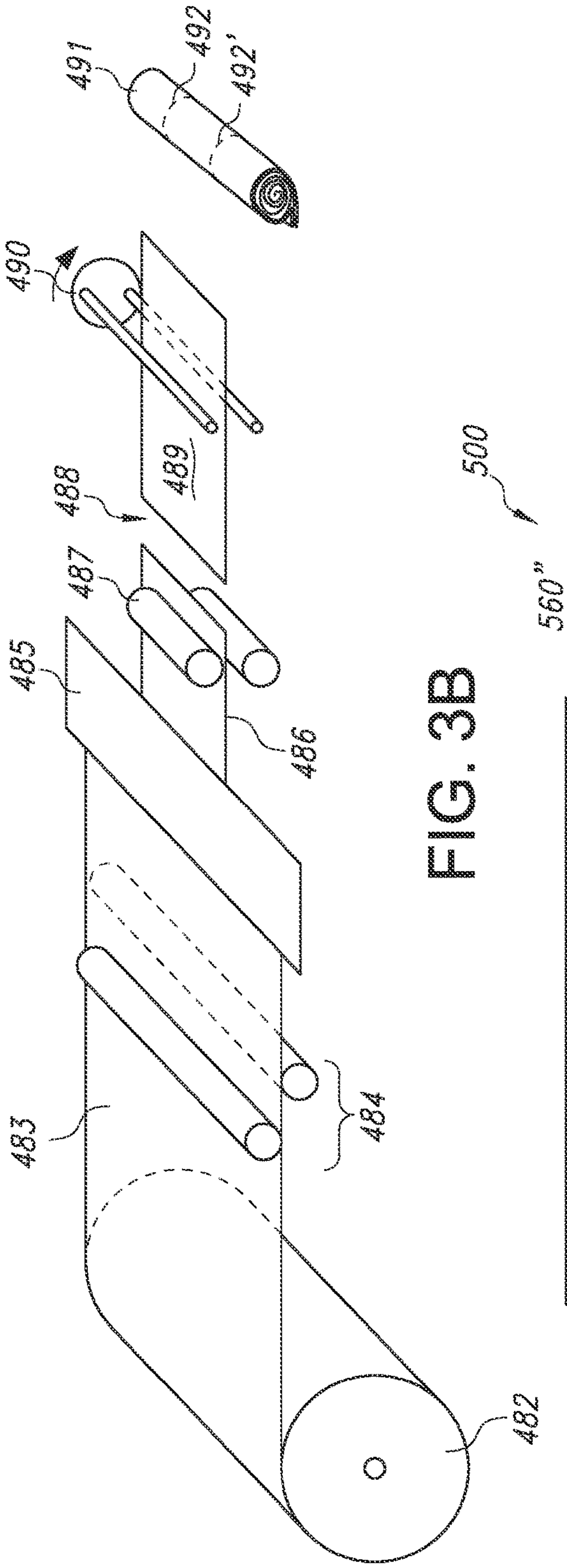

FIGS. 3A and 3B depict two cutting options for use in a multi-lane system. Both depict a three-wipe system, in which the starting roll of wipe material is the width of three individual wipes. It is understood that these figures are exemplary only of a three-wipe system, but the inventive process described herein can be used with any number of wipes desired to be concurrently manufactured, e.g., from 2 wipes to 10 wipes, depending upon the width of the initial roll of wipe material and/or the desired width of the individually formed wipes.

FIG. 3A shows the option in which the width cutting step is performed prior to folding and rolling, while FIG. 3B shows the option in which the width cutting step is performed after folding and rolling is performed. As can be seen in FIG. 3A, the initial roll of wipe material 470 is unwound 471 and its leading edge (not shown) is fed into a processing system. In this processing system, the wipe material is first wetted at a wetting station 472, and then subjected to the width cutting step 474, using cutting devices 473, splitting the initial roll of wipe material 470 into three wipe lanes (475, 475', 475") each having a desired width. The three separated wipe lanes 475, 475', 475" are fed into a folding station 476 where each lane is individually folded (477, 477', 477"). Following the folding step, each folded lane (477, 477', 477") is fed into a cutting apparatus 478, where the individual folded wipes are cut to the desired length. The individual folded and cut wipes are then led to a rolling station 479, where each individual folded and cut wipe is fed into its individual rolling apparatus (described below), such that each wipe can be individually rolled. Each individually rolled wipe 480 (e.g., a rolled and folded wipe) is directly fed into a packaging bucket 481 on a packaging line. It is desired that the individual rolling apparatuses 479 be located in a side-by-side configuration, and that the packaging line be disposed directly underneath the rolling apparatuses 479 so that the final rolled and folded wipes can be placed in the suitable packaging bucket 481 easily and efficiently. As described in more detail below, if desired, the width-cut lanes of wipe material may be rolled in a single rolling apparatus, as opposed to each being rolled by its own individual rolling apparatus.

FIG. 3B shows an alternative option for the width cutting in a process. As can be seen in FIG. 3B, the initial roll 482 of wipe material 483 is extracted and fed into a system, where it is first wetted at wetting station 484. However, in the apparatus and process of FIG. 3B, the wetted wipe material is then subjected to a folding station 485, where the uncut roll is subjected to folding. The resulting uncut folded wipe 486 has a smaller width than the original roll of wipe material. After folding, the folded wipe material is fed to a cutter 487 where it is cut to a desired length (cut 488), and then the folded, length-cut wipe 489 is fed into a single rolling apparatus 490, where it rolled. After rolling, the rolled wipe material 491 is then subjected to the width cutting step, where the full rolled and folded wipe material is cut at cut lines 492, 492', forming individual rolled and folded wipes. Each cut, folded and rolled wipe is then fed into a packaging bucket in a packaging line, as described herein.

Figure 4:
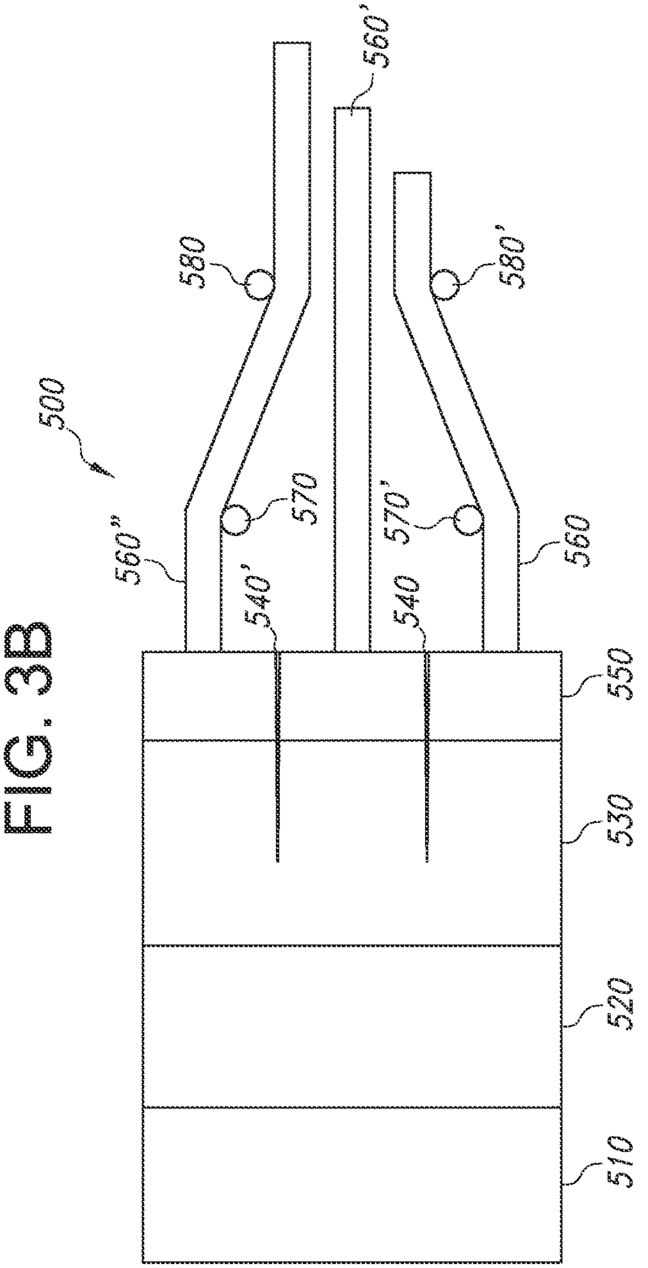
FIG. 4 shows the overview of the present invention, including a parallel rolling and folding process using multiple lanes.

FIG. 4 shows the overview of the present invention, including a parallel rolling and folding process using multiple lanes. The inventive method avoids the need for a “phasing conveyor”, such as that found in U.S. Pat. No. 5,341,915. A phasing conveyor uses variable speed motors and sensors that change the spacing of the products to properly feed individual products into the next step in the process. Here, the present method is free of a phasing conveyor as described herein.

The present invention synchronizes the rolling modules to a conveyor for packaging. As can be seen in FIG. 4, a top view (500) of a system is described. It is noted that the system shown in FIG. 4 uses a method where the width cutting process is performed prior to folding and rolling of the wipe. The initial roll of wipe 510 is unrolled and fed into the apparatus, where it is wetted at step 520 and then width cut at step 530. Cutting devices 540, 540' split the wetted wipe into individual lanes of wipes, where each lane has a width equal to the desired final width of the individual wet wipe. Cut wipe lanes are then subjected to folding at step 550, forming folded lanes of wipes 560, 560', 560".

The present invention may align folded lanes of wipes 560 with each other for ease of processing. As can be seen in the Figure, the folded lanes of wipes 560 are initially a first distance from each other when the lanes are cut and folded. The present invention may include a first alignment wheel 570, 570' and second alignment wheel 580, 580' to move the folded lanes of wipes 560 closer to each other prior to rolling. Of course, FIG. 4 shows a three-wipe system, but it is contemplated that any number of wipes, from 2 to 20 may be used. The folded lanes of wipes 560 may be fed into individual rolling mechanisms and fed into packaging. When the folded lanes of wipes 560 are closer to each other at this step, rolling and deposition of the rolled wipes is easier to accomplish, since the folded and rolled wipes may be dropped directly into a moving bucket, which is sized and shaped to receive one individual folded and rolled wipe. The use of this alignment method further avoids the use of a “Ferris-wheel” type of configuration, referred to as a turret winding process in which individual products are fed into a rotating wheel and placed into buckets one at a time. Here, there is no need for a rotating wheel, but rather the individual folded and rolled wipe is deposited directly into a moving bucket and fed to the packaging system. By avoiding the need for a rotating wheel, the likelihood for misalignment or unrolling during packaging is reduced.

Figure 4A:
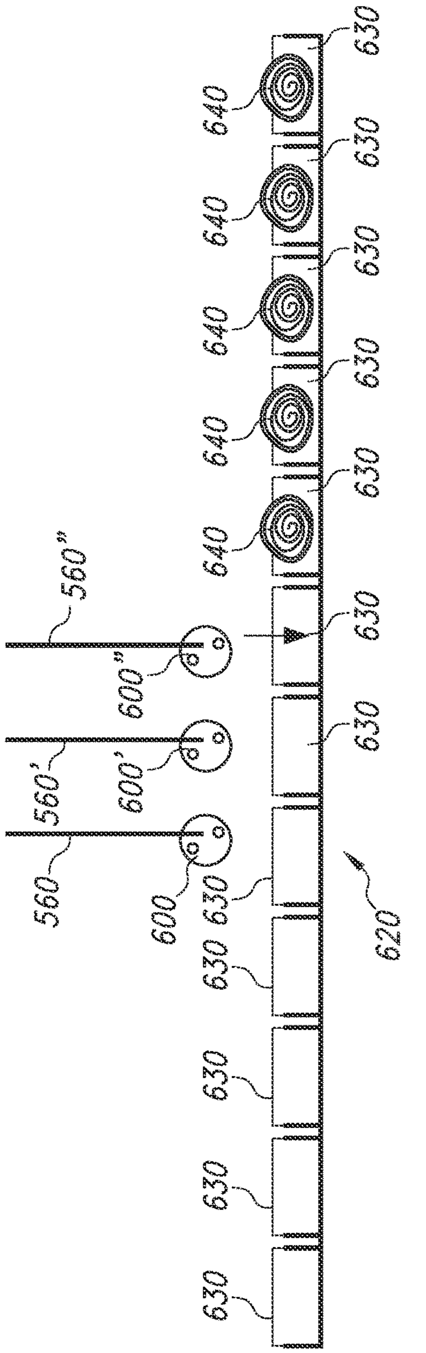
FIG. 4A shows deposition of the individual folded and rolled wet wipes into a packaging line including a plurality of packaging buckets.

FIG. 4A shows deposition of the individual folded and rolled wet wipes into a packaging line (it is noted that the individual wipes are subjected to the length cutting step prior to rolling in this method). The folded wipes 560, 560, 560 are each run through rolling arms (600, 600', 600"), and rolled into individual folded and rolled wipes (640). Each individual folded and rolled wet wipes 640 is placed directly into a moving packaging bucket 630, which is sized and shaped appropriately for receipt of one individual folded and rolled wet wipe 640. The buckets 630 move into a packaging area, where each individual folded and rolled wet wipe 640 is packaged into an individual package, as described below. In a multi-lane system, each individual folded and rolled wet wipe can be deposited at the same time into its individual moving bucket, avoiding the need for a rotating turret winding process.

FIG. 5A-5G shows various options for folding the individual wipe products using a single folding apparatus. The folding techniques and examples shown in FIGS. 5A-5G demonstrate the ability to fold multiple lanes prior to cutting into individual lanes (e.g., prior to the width cutting step). In typical apparatuses folding wipes, a single lane is formed and then cut, however, through the present invention, multiple lanes may be folded prior to being cut into their desired widths. This provides a significant advantage in processing, due to ease of wipe handling and potentially higher speeds than previous methods.

Figure 5A:
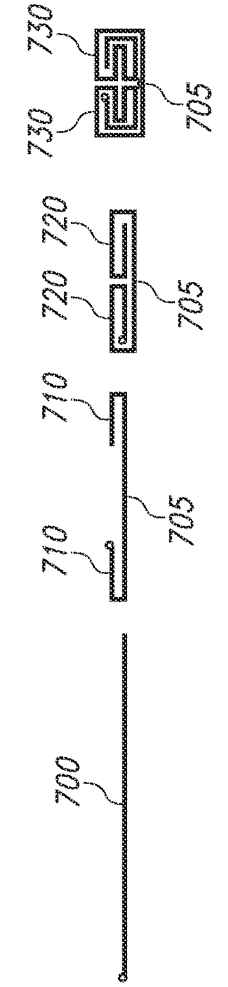
FIGS. 5A-5G show various options for folding the individual wipe products using a single folding apparatus.
Figure 5B:
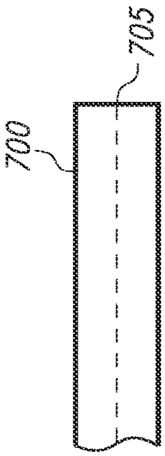
Figure 5C:
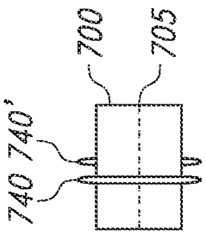

The folding configurations shown in FIGS. 5A-5G are exemplary only, and other folding techniques may be used as desired. FIGS. 5A-5C, for example, show a master roll of wipe material that is the width of two individual wipes (e.g., a two-wipe process). As seen in FIG. 5A, the wipe 700 may be subjected to a first fold 710 on each side, with midpoint 705. The folded portion may be subjected to a second folding 720, and a third folding 730, with the midpoint 705 remaining in the middle of the folded sections. As seen in the top-down view of FIG. 5B, the wipe 700 maintains the midpoint 705 throughout the entire section. The folded wipe seen in FIG. 5A may be cut at midpoint 705. FIG. 5C shows one embodiment of rolling the wipe 700 between two rolling arms 740, 740', where each rolling arm extends at least as long as the entire width of wipe 700. In other embodiments, there may be opposing pairs of rolling arms extending toward each other, where a first pair of rolling arms extends at least about halfway across the width of the wipe 700 and a second pair of rolling arms extends at least halfway across the width of the wipe 700, and therefore the pairs of rolling arms, taken together, extend the entire width, or substantially almost the entire width of the wipe 700.

Figure 5D:
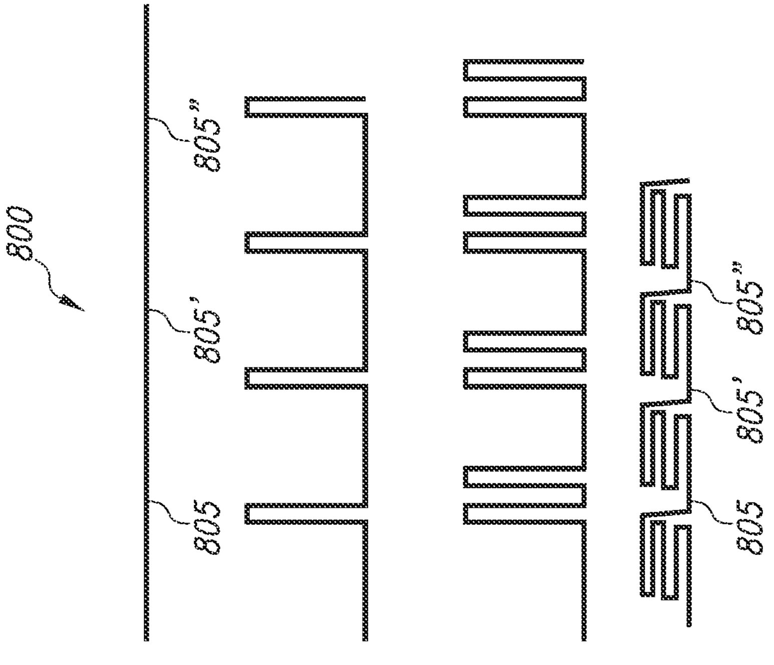
Figure 5E:
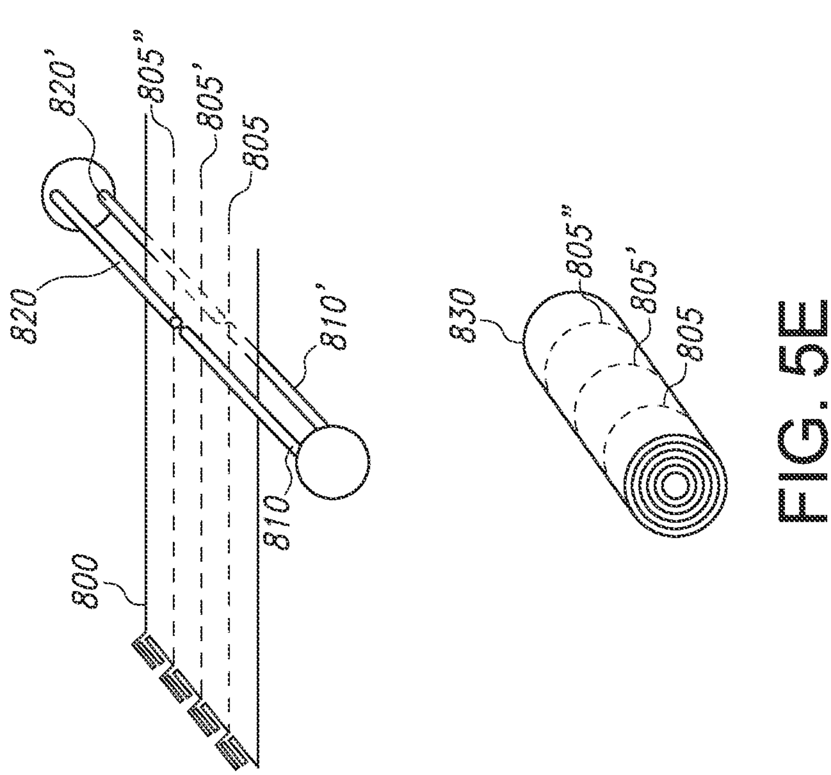

FIGS. 5D and 5E show a method of producing wipes (for exemplary purposes, these figures show a four-wipe width, but any number of widths can be used as desired), with wipe 800 having multiple midpoints 805, where the distance between midpoint-to-midpoint (and midpoint-to-edge) is substantially equal to each other, and where this distance is the desired width of one individual wipe. FIG. 5D shows the wipe 800 in its pre-folded state, followed by exemplary folding steps, with midpoints 805 remaining present throughout the folding steps. As noted, the distance between each midpoint is substantially equal to each other, and thus when cuts are made at midpoints 805, each resulting cut wipe section has substantially the same width. FIG. 5E shows one option for rolling this four-wipe system, including the wipe material 800 with midpoints 805. This example uses a first pair of rolling arms 810, 810' and a second pair of rolling arms 820, 820'.

In this embodiment, rolling arms 810' and 820 extend substantially across the entire width of wipe material 800, while rolling arms 810 and 820' only extend a portion across the width of the wipe material 800. After rolling, the resulting rolled wipe 830 may be cut at midpoints 805, giving rolled wipes of substantially the same width.

Figure 5G:
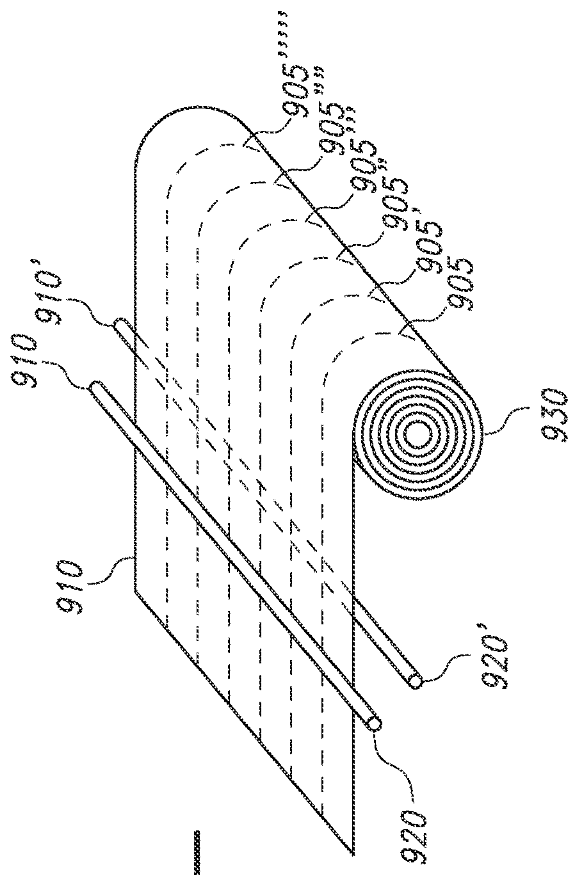
Figure 5F:
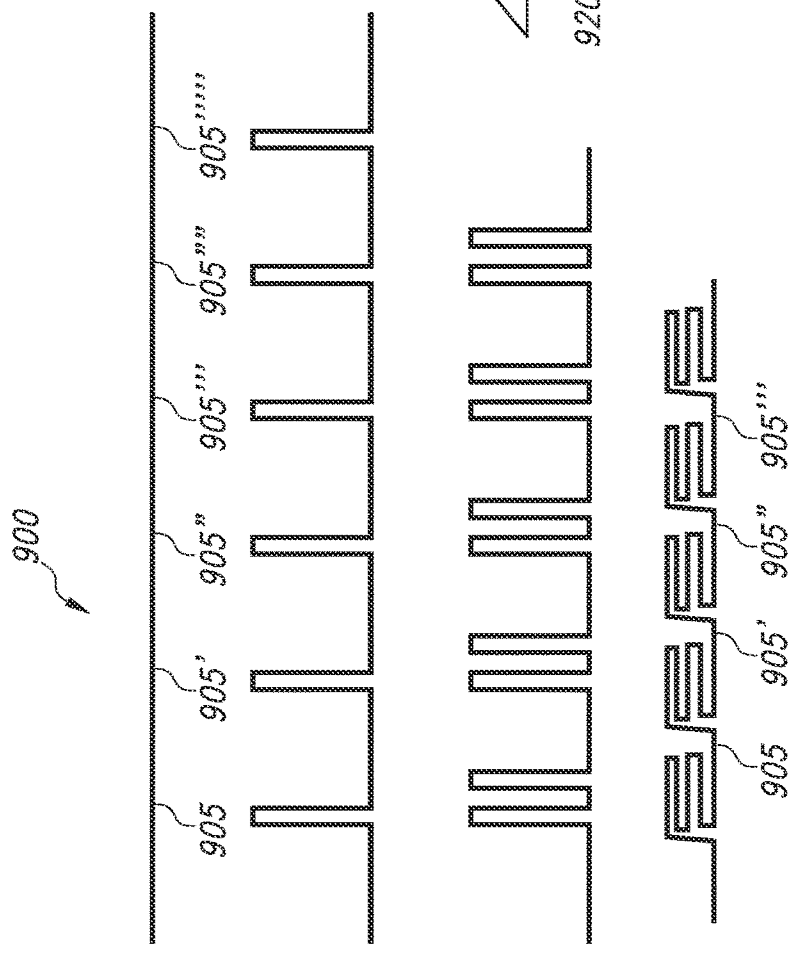

Similarly, FIGS. 5F and 5G show an example of rolling using an alternate set of rolling arms. For exemplary purposes, the wipe in FIGS. 5F and 5G is a seven-wipe system (the wipe material has the width equal to seven individual wipes), but as with the other FIGS. 5A-5E, any number of wipe widths in the starting roll may be used. The starting wipe material 900 has a plurality of midpoints 905 (six midpoints, in this exemplary embodiment), and the wipe material 900 is subjected to a number of folding steps. Again, any folding method may be used as desired, with the midpoints 905 falling in between each folding area. The wipes may be rolled to form rolled material 930, and cut at the midpoints 905 to give individually rolled wipes. In this embodiment, shown in FIG. 5G, the rolling arms include two pairs of arms, which are substantially aligned with each other. First pair of arms 910, 910' are disposed on one side of the wipe, while second pair of arms 920, 920' are disposed on the opposing side of the wipe. Each arm extends substantially to the middle of the wipe material, such that arm 910 extends toward arm 920, and that arm 910' extends toward arm 920'. The ends of the arms 910 and 920 may touch, or they may be separated from each other, just as the ends of arms 910' and 920' may touch or may be separated from each other.

Figure 6A:
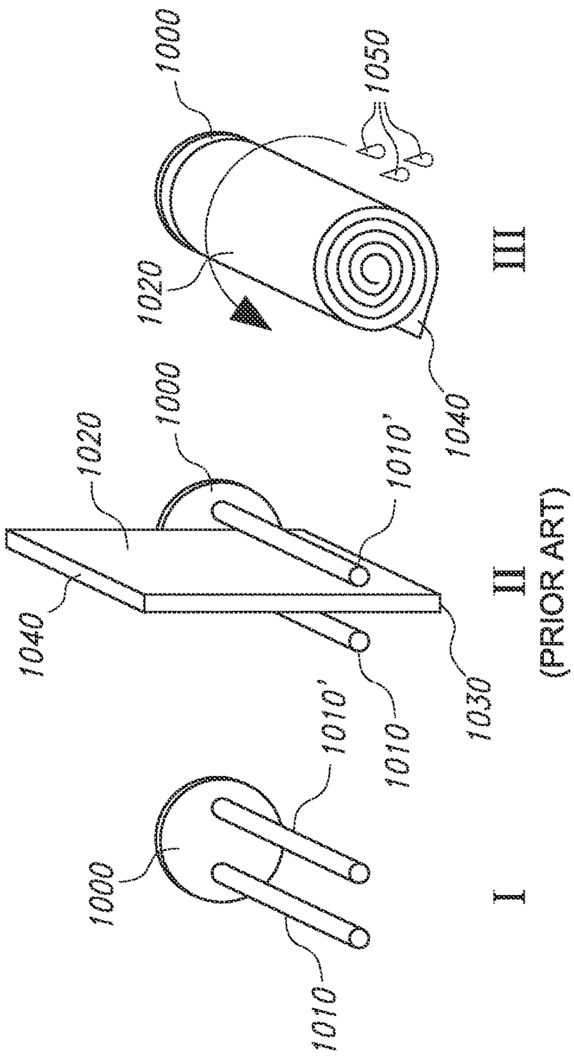
(PRIOR ART) FIG. 6A
FIG. 6A (Prior Art) shows a traditional rolling method.
Figure 6B:
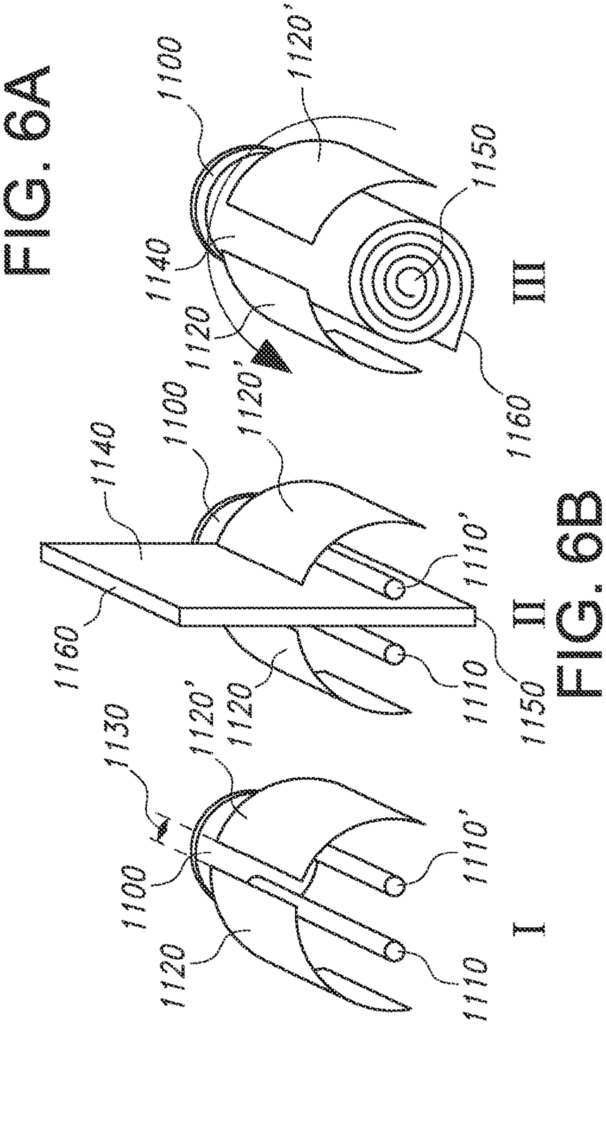
FIGS. 6B and 6C show methods of rolling wetted wipes with a rolling containment system.
Figure 6C:
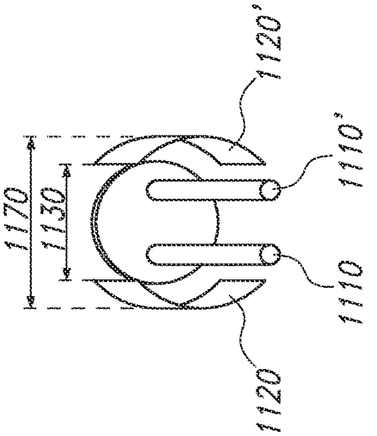

FIG. 6A (Prior Art) shows a traditional rolling method, while FIGS. 6B and 6C show rolling wetted wipes with a rolling containment system of the present invention. The rolling containment system of the present invention helps provide more consistent product roundness, fluid retention, end-tail control, while also allowing the process to run at higher speeds.

As can be seen in the previous attempt to roll a wetted wipe product as depicted in FIG. 6A, a rolling system includes a rolling fork 1000 with parallel rolling arms 1010, 1010', where each rolling arm 1010 extends substantially perpendicularly from the rolling fork 1000. The rolling fork 1000 is capable of rotating in either direction (counterclockwise is shown in FIG. 6A). The rolling fork 1000 may be circular or may be elliptical in cross section. A wetted wipe material 1020 is seen in FIG. 6A. The wetted wipe material 1020 has a front end 1030 and a tail end 1040. In traditional rolling methods, the wetted wipe material 1020 is inserted into the rolling fork 1000, such that the front end 1030 is inserted through the first and second rolling arms 1010, 1010' (depicted in step II of FIG. 6A). As can be seen in step III of FIG. 6A, the rolling fork 1000 has been rotated (in this instance, in a counter clockwise direction), such that the wetted wipe 1020 is rolled to form a rolled wipe 1020'. The front end 1030 of the rolled wipe 1020' is found in the interior of the rolled wipe 1020', at or near the center of the rolled wipe 1020'. The tail end 1040 of the rolled wipe 1020' is found on the exterior of the rolled wipe 1020'.

In these previous methods of rolling wipe materials, the process results in a number of undesirable outcomes. First, as can be seen in FIG. 6A, the tail end 1040 of the rolled wipe 1020' may extend uncontrollably or excessively outwardly from the rolled wipe 1020'. In addition, the resulting rolled wipe 1020' may lack product roundness as the spinning process is uncontrolled. Further, during the spinning process, fluid (1050) may be expelled from the wetted wipe material and therefore be lost from the wipe material. Thus, the end result may be a wetted wipe that has lost fluid, is not suitably rounded, and has a tail end 1040 that extends outwardly from the rolled wipe 1020'.

The present invention may include a rolling containment system, including that depicted in FIGS. 6B and 6C. The rolling containment system may be fixed in place, or may be movable to change its length of separation and/or its radius. The rolling containment system is useful in limiting some of the deficiencies with current rolling systems, and may be incorporated into any wipe forming process, including that described above with regard to existing methods (e.g., FIG. 1) or inventive methods (e.g., FIGS. 2-5). Thus, the rolling containment system may be included in any wipe processing system desired, independent of the initial steps and may be used whether a wipe is folded or not folded.

As seen in FIGS. 6B and 6C, the rolling system includes a rolling fork 1100 with parallel rolling arms 1110, 1110', where each rolling arm 1110 extends substantially perpendicularly from the rolling fork 1100. The rolling fork 1100 is capable of rotating in either direction (counterclockwise is shown in FIG. 6B). The rolling fork 1100 may be circular or may be elliptical in cross section.

The rolling containment system in FIGS. 6B and 6C also includes a pair of opposing containment sleeves 1120, 1120', which have a generally rounded interior portion. The pair of containment sleeves 1120, 1120' may be made of any material, including plastic, metallic, glass, or other materials desired in processing. The pair of opposing containment sleeves 1120, 1120' extend outwardly about the rolling arms 1110, and when the containment sleeves 1120, 1120' are in position, form the general shape and size desired for the final rolled wipe product. The containment sleeves 1120, 1120' are separated at a top region by a gap 1130. Desirably, the gap 1130 is large enough to receive a first end 1150 of a wet wipe 1140. Note that the wet wipe 1140 also includes trailing end 1160, opposite the first end 1150. As can be seen in Step II of FIG. 6B, in use, the first end 1150 of a wet wipe 1140 is fed into the rolling containment system, such that the first end 1150 is fed through the first gap 1130 and extends between the rolling arms 1110. Desirably, the first end 1150 of wet wipe 1140 does not extend through the bottom region of the containment system. Once the first end 1150 of wet wipe 1140 is inserted into the rolling system, the containment sleeves 1120, 1120' may be moved together, such that the generally rounded interior portions of the containment sleeves 1120, 1120' are sized and shaped to the desired size and shape of the final rolled wipe. Gap 1130 is shortened, due to the movement of the containment sleeves 1120, 1120' toward each other. As can be seen in FIG. 6C, the containment sleeves 1120, 1120' have an initial width of 1170 (as measured from outside surface of the containment sleeves 1120, 1120'), which can be reduced or increased as the containment sleeves 1120, 1120' move toward or away from each other. The bottom regions (e.g., opposing the gap 1130) of the containment sleeves 1120, 1120' may be capable of coming into contact with each other when the containment sleeves 1120, 1120' are moved toward each other. While the top region may still have a gap 1130, the bottom region may have no gap.

Once the first end 1150 of the wet wipe 1140 is inserted through the rolling arms 1110, and the containment sleeves 1120, 1120' are positioned in a suitable distance from each other, the rolling arms 1110 may rotate (in either a clockwise or counter-clockwise direction). This rotation causes the wipe 1140 to become a rolled wipe, with the first end 1150 being located in the center region of the rolled wipe and the trailing end 1160 located external of the rolled wipe. Due to the containment of the wipe caused by the containment sleeves 1120, 1120', the process reduces the amount of fluid accidentally released from the wet wipe 1140 during the rolling process, and further, the generally rounded shape of the interior of the containment sleeves 1120, 1120' gives the rolled wet wipe a desired shape. Further, given that the trailing end 1160 of the wet wipe is contained within the containment sleeves 1120, 1120', it is less likely to be freely and undesirably extending outwardly from the rolled wipe.

The containment sleeves 1120, 1120' are secured to the apparatus by containment arms (not shown), which can be any desired means to secure the containment sleeves 1120, 1120' to the rolling device. It is desired that the containment arms be capable of retracting and contracting, so as to change the width 1170 (and therefore the gap 1130), during use of the rolling apparatus. Further, if the wet wipe 1140 is increased in size, or if the desired diameter of the final rolled wet wipe is modified to be larger or smaller, the containment sleeves 1120, 1120' can be moved to match the desired size.

The containment sleeves 1120, 1120' may be secured to the device by spring loaded containment arms (not shown) or at least one containment sleeve 1120 may be spring loaded, which allow the containment sleeves 1120, 1120' to have automatic, intimate contact with the wet wipe 1140 during use. The use of spring loaded containment arms may allow the device to compress the wet wipe 1140 during rolling, and therefore give the final rolled wipe a smaller diameter, while still giving a defined shape and without risk of losing an undesirable amount of fluid during the rolling process.

It is desired that a system for rolling wet wipes includes a pair of the containment sleeves 1120, 1120' disposed about every pair of rolling arms in the device. Thus, if the apparatus uses two sets of rolling arms (e.g., to roll two wet wipes concurrently), each pair of rolling arms would have containment sleeves 1120, 1120' disposed about them. The rolling containment system of the present invention provides a number of benefits to traditional rolling processes. One benefit is that the rolling containment system allows the rolled wipe to maintain its desired compact structure and consistent roundness. The roundness of the folded and rolled wipe is defined as the measure of how closely the shape of the rolled wipe approaches that of a mathematically perfect circle as measured by its cross-section after rolling. It is desired that the interior surfaces of the containment sleeves 1120, 1120', when moved together to the desired size, form a containment area that is the same or substantially the same radius as the desired radius of the final rolled wipe.

After rolling the individual folded and rolled wipe, it may be deposited directly into a moving bucket, where it is taken to a packaging system for packaging the individual wipe. In a system including a plurality of rolling containment systems, multiple folded wipe lanes may be rolled concurrently, producing a plurality of folded and rolled wipes in a more efficient manner.

In addition, the rolling containment system allows for the fluid within the folded wipe to be maintained within the wipe during the rolling process. During rolling, the folded wipe is spun around and within a rolling fork to achieve a rolled wipe, and inherently during the rolling process some fluid is forced out of the wipe due to centrifugal forces. The rolling containment system provides a more contained area for the wipe to be located during rolling, such that the fluid will be less likely to be lost from the wipe. Even if some fluid is thrown from the spinning wipe, it may be retained within the rolling containment system and some fluid will be re-directed back to the spinning wipe. For example, the process described herein may cause loss of less than 1% of the starting liquid cleanser in the wipe prior to rolling (measured by weight), or may cause loss of less than 2%, or 3% or 5% of the starting liquid cleanser in the wipe prior to rolling (measured by weight).

Further, the rolling containment system protects against movement of the end-tail of the rolled wipe. With reference to FIG. 6B, as the wipe 1140 is being rolled and after rolling, the interior end of the wipe 1150 is rolled into the cross-sectional center of the final rolled wipe. The trailing end of the wipe 1160 is on the exterior of the cross-section of the final rolled wipe. In traditional rolling processes, such as those without containment systems as defined herein, the trailing end of the wipe 1160 inherently moves away from the cross-sectional center of the spun wipe, making it difficult to maintain the rolled wipe in a compact circular rolled form. The rolling containment system of the present invention maintains the trailing end of the wipe 1160 in a location closer to the final rolled wipe, maintaining the final rolled product with the trailing end of the wipe 1160 in a substantially consistent orientation and location with regard to the rest of the rolled wipe. Maintenance of the trailing end of the wipe 1160 after rolling is helpful in consistently placing the rolled wipe in a desired location and position for further packaging into the outer package.

Each of the benefits described above for the rolling containment system allows for more controlled and consistent rolling of the folded wipe, providing a substantially consistent folded and rolled wipe, where the folded and rolled wipe is placed into a desired position and location on the conveyor for packaging. With the control provided by the rolling containment system, the processing apparatus may run at speeds that are higher than traditional systems, allowing for more folded and rolled wipes to be formed in less time (e.g., higher efficiency).

Once rolling and folding is completed and the final wipe is prepared, the wipe to be packaged measures about 20% of the length and width of the starting wipe, and about 10 to about 22 times the thickness of the starting wipe. The individually rolled and folded wipe can be packaged in an air-tight sealed package, including polymeric and/or foil-lined packages described above. The wipe is desirably packaged in a package that is capable of being torn open by the hands of a user without the need for additional tools or scissors to open the package. The package may include a tear notch to allow the user to more simply open the package and dispense the wet wipe. The package is also desirably air-tight to avoid loss of moisture or other liquid from the wet wipe prior to its intended use by the user. The individually wrapped packages are desirably small enough to be held in the hand by the user, and further, are small enough such that several may be carried by the user in a carrying device, such as a purse, handbag, backpack, or even in the pocket of the user. The individually wrapped wipe may be contained in a package that resembles a similar look and feel of a larger sized package, where the larger sized package includes a plurality of wet wipes stacked or otherwise contained within one package.

A number of individually wrapped wet wipes may be contained within one larger package, such as a gusseted bag or other pouch. The larger outer package need not necessarily be air- or liquid-tight, since the individually wrapped wet wipes contained therein are each air-tight and/or liquid-tight. The larger outer package may be resealable if desired. The larger package may include 5, 10, 20, 50, or any number of individually wrapped wet wipes. With the larger package, the user may simply remove one or more than one of the individually wrapped wet wipes at a time for future use, and the remaining wet wipes within the larger package will retain their moisture and use without risk of dry-out. The larger package may be at least partially transparent or translucent, so that the user can visually see the plurality of individually wrapped wet wipes contained therein.

The inventive method described herein provides a more efficient method to prepare individually packaged rolled and folded wet wipe products. The method set forth herein may result in an improvement of more than two times the number of individually packaged wipes per minute as compared to previous methods.

The present invention includes a method of preparing a wipe having a reduced size for packaging, and further includes the method of packaging the individual wipe with reduced size. The invention also includes the individually wrapped wipes themselves, and includes a system including an outer package, which contains a plurality of individually wrapped wipes. The outer package may include a means for resealing.

EXAMPLE

The number of wipes that can be produced would be expected to increase through the use of the present invention, while still maintaining a similar space footprint within a manufacturing facility. The invention allows for the use of multiple lanes of wipe material being concurrently processed, and allows for a slight increase in the linear speed of processing of wipe material compared to current manufacturing practice. One rolling and folding process is capable of running one single lane at approximately 18 meters/minute. It was estimated that the present invention could run one single lane at about 20.88 meters/minute, which is approximately a 16% increase over present systems. Since previous methods of rolling and folding individual wipes were only capable of processing single lanes at a time, the present invention could not only increase output by slightly increasing speed, but also by adding concurrent lane processing. It was estimated that, by running three lanes concurrently, at the 20.88 meters/minute linear speed, the output would be about 350 PPM, and running four lanes concurrently would give an output of about 464 PPM. Adding additional lanes, while maintaining the linear speed constant, would continue to increase output.

A prototype manufacturing system was developed and was run at a linear speed of 20.88 meters/minute. The prototype was a two-lane system, and was determined to produce an output of 232 PPM. The prototype was capable of producing quality output individual wipes, including the wetting station (using pumps and a wet out bar), drives, cutting, folding, and rolling stations. It is estimated that if a third lane was added to the system, the result would be approximately 350 PPM, and estimated that if a fourth lane was added to the system, the result would be approximately 464 PPM (however the packaging material would need to be modified to accommodate this output level).

The manufacturing footprint size reduction per manufacturing line compared to the existing system would be approximately 25% (this does not include that less manufacturing lines are needed).

The invention claimed is:

1. An apparatus for rolling wetted wipes comprising:
a. A rolling fork having a pair of substantially parallel rolling arms; and
b. A rolling containment system, comprising a pair of opposing containment sleeves extending outwardly about the pair of elongated arms;
wherein the pair of opposing containment sleeves are separated at a top portion by a gap, wherein the gap is large enough to receive a first end of a folded wipe, and
wherein the pair of opposing containment sleeves is capable of retracting and contracting with respect to each other.

2. The apparatus of claim 1, wherein the pair of opposing containment sleeves have a generally rounded interior portion.

3. The apparatus of claim 1, wherein at least one of the opposing containment sleeves is spring loaded to effectuate said retracting and contracting.

4. The apparatus of claim 1, wherein the pair of opposing containment sleeves are spring loaded to effectuate said retracting and contracting.

5. The apparatus of claim 1, wherein the pair of opposing containment sleeves comprise plastic, metallic, or glass materials.

6. The apparatus of claim 1, wherein the pair of opposing containment sleeves in position form the general shape and size of a rolled wipe product.

7. The apparatus of claim 1, wherein the pair of opposing containment sleeves are not separated by a gap at a bottom portion.

8. An apparatus for rolling wetted wipes comprising:
a. A rolling fork having a pair of substantially parallel rolling arms; and
b. A rolling containment system, comprising a pair of opposing containment sleeves extending outwardly about the pair of elongated arms;
wherein the pair of opposing containment sleeves are separated at a top portion by a gap, wherein the gap is large enough to receive a first end of a folded wipe,
wherein the pair of opposing containment sleeves is capable of retracting and contracting with respect to each other, and wherein at least one of the opposing containment sleeves is spring loaded to effectuate said retracting and contracting.

9. The apparatus of claim 8, wherein the pair of opposing containment sleeves have a generally rounded interior portion.

10. The apparatus of claim 8, wherein the pair of opposing containment sleeves comprise plastic, metallic, or glass materials.

11. The apparatus of claim 8, wherein the pair of opposing containment sleeves in position form the general shape and size of a rolled wipe product.

12. The apparatus of claim 8, wherein the pair of opposing containment sleeves are not separated by a gap at a bottom portion.

13. An apparatus for rolling wetted wipes comprising:
a. A rolling fork having a pair of substantially parallel rolling arms; and
b. A rolling containment system, comprising a pair of opposing containment sleeves extending outwardly about the pair of elongated arms;

wherein the pair of opposing containment sleeves are separated at a top portion by a gap, wherein the gap is large enough to receive a first end of a folded wipe, wherein the pair of opposing containment sleeves is capable of retracting and contracting with respect to each other, and wherein the pair of opposing containment sleeves are spring loaded to effectuate said retracting and contracting.

14. The apparatus of claim 13, wherein the pair of opposing containment sleeves have a generally rounded interior portion.

15. The apparatus of claim 13, wherein the pair of opposing containment sleeves comprise plastic, metallic, or glass materials.

16. The apparatus of claim 13, wherein the pair of opposing containment sleeves in position form the general shape and size of a rolled wipe product.

17. The apparatus of claim 13, wherein the pair of opposing containment sleeves are not separated by a gap at a bottom portion.

* * * * *